United States Patent
Huff et al.

(10) Patent No.: US 11,999,095 B2
(45) Date of Patent: Jun. 4, 2024

(54) BOTTLE MANUFACTURING METHOD AND BOTTLE

(71) Applicant: INNOVATE INTERNATIONAL SHENZHEN LTD., Shenzhen (CN)

(72) Inventors: Leonard Scott Huff, Shenzhen (CN); Han Lin, Shenzhen (CN)

(73) Assignee: INNOVATE INTERNATIONAL SHENZHEN LTD. (CN)

( * ) Notice: Subject to any disclaimer, the term of this patent is extended or adjusted under 35 U.S.C. 154(b) by 0 days.

(21) Appl. No.: 17/812,948

(22) Filed: Jul. 15, 2022

(65) Prior Publication Data
US 2023/0347572 A1 Nov. 2, 2023

(30) Foreign Application Priority Data
Apr. 29, 2022 (CN) .......................... 202210466753.6

(51) Int. Cl.
*B32B 41/00* (2006.01)
*B29C 63/00* (2006.01)
(Continued)

(52) U.S. Cl.
CPC .......... *B29C 63/0073* (2013.01); *B29C 63/02* (2013.01); *B29C 63/48* (2013.01);
(Continued)

(58) Field of Classification Search
CPC ..... B29C 63/0073; B29C 63/02; B29C 63/48; B29C 2063/485; B29K 2021/003; B29K 2995/0026; B29L 2031/7158
(Continued)

(56) References Cited

U.S. PATENT DOCUMENTS

| 7,210,602 B2 | 5/2007 | Blanchester | B67D 1/07 |
| 2003/0006605 A1 | 1/2003 | Ross | B42D 15/00 |

(Continued)

FOREIGN PATENT DOCUMENTS

| CA | 2814674 A1 * | 11/2013 | |
| CN | 107310810 A | 11/2017 | B65D 1/02 |

(Continued)

OTHER PUBLICATIONS

First Office Action issued in Chinese Application No. 202210466753.6 (with translation), dated Oct. 8, 2022, 13 pgs.
(Continued)

*Primary Examiner* — Michael N Orlando
*Assistant Examiner* — Joshel Rivera
(74) *Attorney, Agent, or Firm* — HAYES SOLOWAY P.C.

(57) ABSTRACT

The present application discloses a bottle manufacturing method and a bottle, which comprises steps of: manufacturing a protection layer; printing an artwork on a surface of the protection layer; manufacturing a transparent layer; laminating the protection layer and the transparent layer having the artwork printed; arranging the protection layer and the transparent layer on a bottle body to make the artwork locate between the protection layer and the transparent layer. By printing the artwork between the protection layer and the transparent layer, the present application provides the artwork a good protection to prevent the artwork from worn, and makes the product a relatively high decoration quality.

11 Claims, 2 Drawing Sheets

(51) Int. Cl.
  *B29C 63/02* (2006.01)
  *B29C 63/48* (2006.01)
  *B29K 21/00* (2006.01)
  *B29L 31/00* (2006.01)

(52) U.S. Cl.
  CPC .. *B29C 2063/485* (2013.01); *B29K 2021/003* (2013.01); *B29K 2995/0026* (2013.01); *B29L 2031/7158* (2013.01)

(58) Field of Classification Search
  USPC ............... 156/60, 64, 350, 351, 378, 379
  See application file for complete search history.

(56) References Cited

U.S. PATENT DOCUMENTS

| | | | |
|---|---|---|---|
| 2006/0198978 A1 | 9/2006 | Antonini | B32B 33/00 |
| 2007/0048480 A1 | 3/2007 | Lavosky | B32B 33/00 |
| 2018/0249853 A1 | 9/2018 | Fu et al. | A47G 23/02 |
| 2021/0035474 A1* | 2/2021 | Bartlein | G09F 3/0288 |
| 2022/0379650 A1* | 12/2022 | McKillip | B41F 19/001 |

FOREIGN PATENT DOCUMENTS

| | | | |
|---|---|---|---|
| CN | 211324611 U | 8/2020 | ............... A47K 5/00 |
| CN | 215922889 U | 3/2022 | ............. B65D 23/14 |
| CN | 215922890 U | 3/2022 | ............. D65D 23/14 |

OTHER PUBLICATIONS

Second Office Action issued in Chinese Application No. 202210466753.6 (with machine translation), dated Dec. 15, 2022, 15 pgs.

Yixin, "Modern Printing Anti-counterfeiting Technology", China Light Industry Press, ISBN 7-5019-5657-X, 2007, with abstract, 5 pgs.

Yanfen, "Postpress Processing Technology" Shanghai Jiaotong University Press, ISBN 97807-313-04958-2, 2008, with abstract, 5 pgs.

Office Action issued in U.S. Appl. No. 17/743,939, dated Jul. 27, 2023, 21 pgs.

* cited by examiner

BOTTLE MANUFACTURING METHOD AND BOTTLE

CROSS-REFERENCE TO RELATED APPLICATIONS

This application claims priority to Chinese Patent Application No. 202210466753.6, filed on Apr. 29, 2022. The content of all of which is incorporate herein by reference.

FIELD OF THE DISCLOSURE

The present application relates to the technical field of container manufacturing, specifically pertaining to a bottle manufacturing method and a bottle.

BACKGROUND

A container refers to a basic device for containing material and using a shell as the main structure. A bottle is a form of container. Nowadays the bottle has been widely used, such as holding liquid, holding flowers, acting as decoration, and more. However, for traditional bottle sold as commodity, an artwork is usually attached to the outside of the bottle body. A common adopted technology is printing artworks on an outermost side of the bottle body. A main disadvantage is the labels or the artworks are easily worn or even peeled off during daily use or cleaning process of the bottle.

Therefore, the current technology needs to be improved.

BRIEF SUMMARY OF THE APPLICATION

According to the defects in the prior art described above, the present application provides a bottle manufacturing method and a bottle, to solve the problem in the prior art that a printed artwork on the bottle is easily worn or peeled off. Based on the previously stated defects in existing decoration technologies, the new application provides a bottle manufacturing method and decoration technology that allows for longer decoration life.

The technical solution of the present application is as follows:

In a first aspect, the present application provides a bottle manufacturing method is comprised of:
  Manufacturing a protection layer;
  Printing an artwork on a surface of the protection layer;
  Manufacturing a transparent layer;
  Laminating the protection layer with printed artwork and the transparent layer;
  Arranging the protection layer with printed artwork and the transparent layer on a bottle body to make the artwork locate between the protection layer and the transparent layer.

The bottle manufacturing method is further comprised of:
  Manufacturing the bottle body by a blow molding or an injection molding;
  Arranging a fitting area on the bottle body, and a size of the fitting area adapts to a size of the protection layer and the transparent layer.

Further, in the bottle manufacturing method, the manufacturing a protection layer is comprised of:
  Adopting a plastic film or a plastic sheet;
  Manufacturing the protection layer by using at least one layer of the film or the sheet through any one of the following processes: extrusion, blown film, injection molding, and compression molding.

Further, in the bottle manufacturing method, the plastic materials include but not limited to any of the following materials: thermoplastic elastomer, polyethylene terephthalate, polyethylene, and polypropylene.

Further, in the bottle manufacturing method, the printing an artwork on the surface of the protection layer is comprised of:
  Manufacturing an artwork fully or partially adapts to a shape and a size of the protection layer;
  Arranging a first adhesive layer adapting to the artwork on the surface of the protection layer;
  Printing the artwork on the surface of the protection layer by adopting any one of the following processes: offset printing, digital printing, and thermal transferring, to make the artwork adhere to the first adhesive layer.

Further, in the bottle manufacturing method, the artwork is made of ink or toner.

Further, in the bottle manufacturing method, the manufacturing of the transparent layer is comprised of:
  Adopting a transparent or semitransparent elastomer material;
  Manufacturing the transparent layer by adopting any of the following processes: injection molding, extrusion, compression molding, liquid injection molding, and calendaring.

Further, in the bottle manufacturing method, the elastomer is any one of thermoplastic elastomer, thermoplastic polyurethanes, silicon, and rubber.

Further, in the bottle manufacturing method, the laminating the protection layer with printed artwork and the transparent layer is comprised of:
  Adhering the transparent layer to a surface of the protection layer having the artwork arranged through a second adhesive layer.

In a second aspect, the present application provides a bottle which is manufactured by the bottle manufacturing method described above.

The bottle manufacturing method provided by the present application comprises steps of manufacturing a protection layer; printing an artwork on a surface of the protection layer; manufacturing a transparent layer; laminating the protection layer with printed artwork and the transparent layer; arranging the protection layer and the transparent layer on a bottle body to make the artwork locate between the protection layer and the transparent layer. By printing the artwork between the protection layer and the transparent layer, the present application provides the artwork a good protection to prevent the artwork from worn, and makes the product with a relatively high decoration quality.

100. bottle body; 110. fitting area; 200. transparent layer; 300. artwork; 500. protection layer; 600. first adhesive layer; 700, second adhesive layer.

DETAILED DESCRIPTION OF EMBODIMENTS

In order to make the purpose, technical solution and the advantages of the present application clearer and more explicit, further detailed descriptions of the present application are stated herein, referencing to the attached drawings and some embodiments of the present application. It should be understood that the detailed embodiments of the application described here are used to explain the present application only, instead of limiting the present application.

Unless otherwise defined, all technical and scientific terms used herein have the same meaning as commonly understood by those skilled in the technical field to which this application belongs. The terms used herein are for the purpose of describing embodiments only, and are not intended to limit the present application.

In the embodiments and the scope of the patent application, unless the context has a special limitation, "a" and "the" can generally refer to a single or a plural.

In addition, if there are descriptions involving "first", "second", etc. in the embodiments of the present application, the descriptions of "first", "second", etc. are only used for the purpose of description, and should not be construed as indicating or implying Its relative importance or implicitly indicating the number of technical features. Thus, a feature delimited with "first" or "second" may expressly or implicitly include at least one of that feature. In addition, the technical solutions in various embodiments can be combined with each other, but must be based on the realization by those skilled in the art. When a combination of the technical solutions is contradictory or cannot be realized, it should be considered that the combination of such technical solutions neither exist, nor is within the scope of protection required by the present application.

In the prior art, after a bottle is manufactured as a product, an artwork is printed directly on the bottle body. However, during the transportation, usage and cleaning process, the artwork on the bottle body is easily worn, resulting in the artwork peeling off, and shows a poor appearance of the bottle body.

Thus, the present application provides a technical solution able to solve the technical problems stated above, the details of which will be described in following embodiments.

Figure 1:
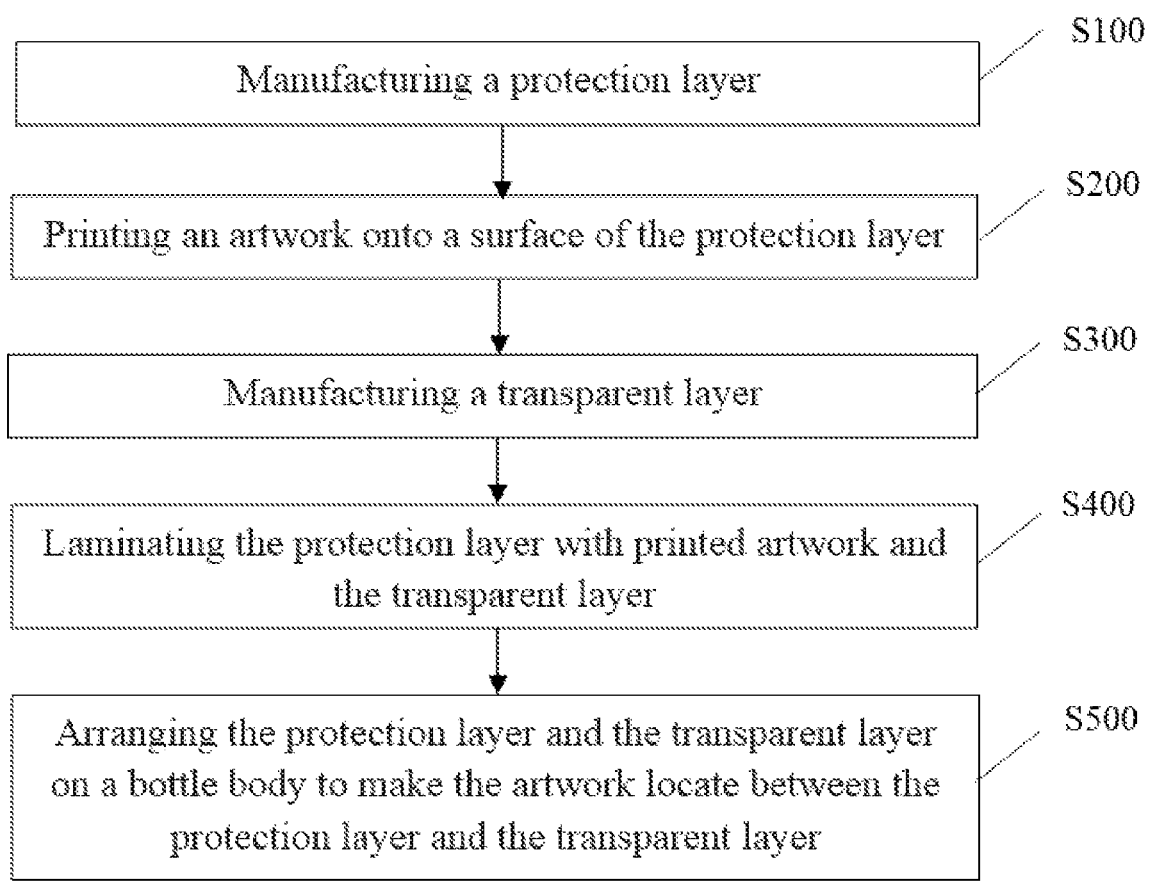
FIG. 1 illustrates a flow chart on an embodiment of the bottle manufacturing method provided by the present application.
Figure 2:
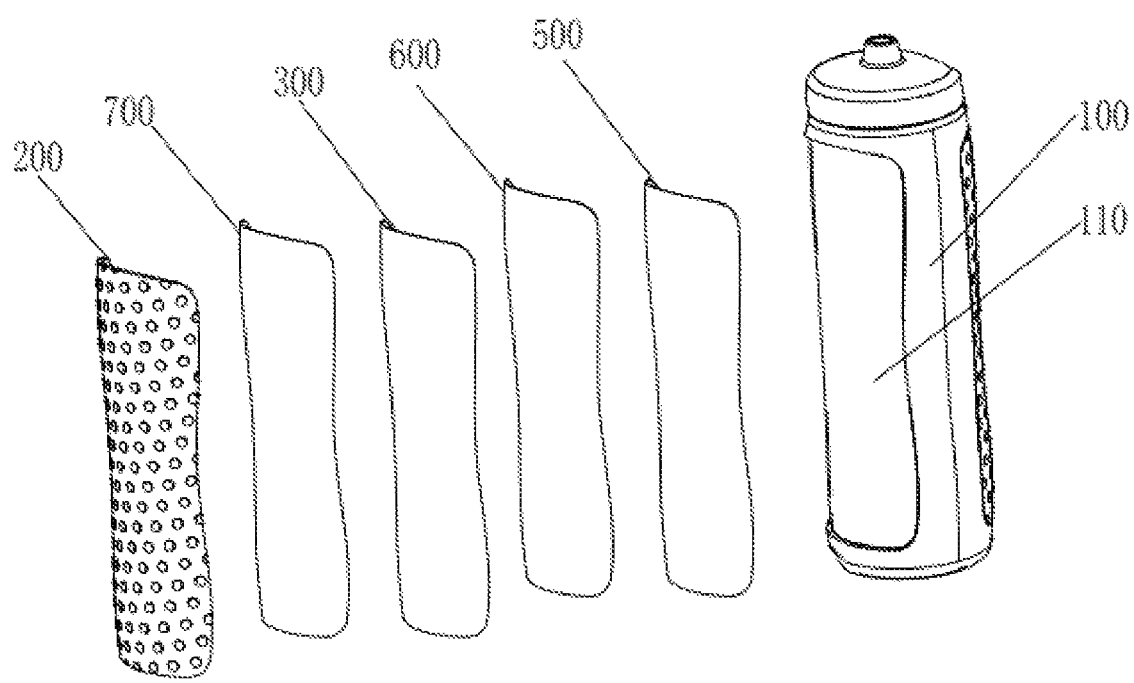
FIG. 2 illustrates a schematic structural diagram on the bottle body manufactured by the bottle manufacturing method provided by the present application.

Referencing FIG. 1 and FIG. 2 together. FIG. 1 illustrates a flow chart on an embodiment of the bottle manufacturing method provided by the present application; FIG. 2 illustrates a schematic structural diagram on the bottle body manufactured by the bottle manufacturing method provided by the present application. The method comprises following steps:

S100. manufacturing a protection layer 500;
S200. printing an artwork 300 on a surface of the protection layer 500;
S300. manufacturing a transparent layer 200;
S400. laminating the protection layer 500 with printed artwork and the transparent layer 200;
S500. arranging the protection layer 500 and the transparent layer 200 on a bottle body 100 to make the artwork 300 locate between the protection layer 500 and the transparent layer 200.

In the embodiment of the present application, the artwork 300 is, but not limited to, various graphics, trademarks, or LOGOs. It should be understood that the present application does not limit a type or a shape of the artwork 300, and the protection layer 500 is in a direct contact with the bottle body 100. The protection layer 500 plays a role of carrying and protecting the artwork 300; further, the protection layer 500 is transparent. The transparent layer 200 also plays the role of protecting the artwork 300, and the transparent layer 200 can also transmit light at the same time, making the artwork 300 be displayed on the bottle body 100 to realize a more attractive decoration effect. After printing the artwork 300 on the protection layer 500, laminating the protection layer 500 and the transparent layer 200 together to make the artwork 300 be arranged between the transparent layer 200 and the protection layer 500, thus the artwork 300 will not be worn, and the display of the artwork 300 is not affected. In actual product, both the protection layer 500 and the transparent layer 200 have two sides, a concave side of the protection layer 500 adhered to the bottle body 100 is defined as an inner side, and a convex side of the protection layer 500 facing away from the bottle body 100 is defined as an outer side. The same definition is adopted for the transparent layer 200, thus no further details are described herein. On one hand, when the artwork 300 is arranged on the outer side of the protection layer 500, the inner side of the transparent layer 200 and the outer side of the protection layer 500 are laminated together, and the inner side of the protection layer 500 is adhered to the bottle body 100 to make the artwork 300 locate between the protection layer 500 and the transparent layer 200 to achieve a better protection for the artwork 300.

It should be understood that, in actual use, the artwork 300 may be arranged between the protection layer 500 and the transparent layer 200 according to the requirement. In addition, in the prior art, the artwork 300 is arranged on an outer surface of the bottle body 100, only a single-layer 2-dimensional image decoration effect can be generated. While in the present application, by arranging the artwork 300 between the protection layer 500 and the inner side of the transparent layer 200, a 3-dimensional decorative effect, especially along a depth direction of the label, will be generated.

In an embodiment, the bottle manufacturing method further comprises:

S401, manufacturing the bottle body 100 by blow molding or injection molding;

The bottle body 100 can be produced by blow molding or injection molding, and a material of the bottle body 100 comprises any one of materials: polypropylene, polyethylene, polycarbonate, polyethylene terephthalate and ethylene vinyl acetate. The bottle body 100 may be soft and flexible, or rigid.

S402, arranging a fitting area 110 on the bottle body 100, which has a size adapt to a size of the protection layer 500 and the transparent layer 200.

Referencing to FIG. 2, the size of the protection layer 500 and the size of the transparent layer 200 are matched, and the size of the fitting area 110 matches both the size of the protection layer 500 and the size of the transparent layer 200. The depth of the fitting area 110 is consistent with a thickness of the protection layer 500 and the transparent layer 200, so that the protection layer 500 and the transparent layer 200 are protected effectively from peeling off when being applied to the fitting area 110, and the outer side of the entire bottle body 100 is smooth, to make the entire bottle more beautiful in appearance.

In an embodiment, manufacturing the protection layer 500 comprises:

S110, adopting a plastic film or a plastic sheet;
S120, manufacturing the protection layer 500 by at least one layer of the film or the sheet through any one of the following processes: extrusion, blown film, injection molding, and compression molding.

It can be understood that a plastic material adopted may be in a form of film or sheet, and the film or the sheet may be in a roll to be cut during production. The plastic material comprises, but not limited to, any one of thermoplastic elastomer, polyethylene terephthalate, polyethylene and polypropylene. In actual production, the protection layer 500 may be a single layer structure, that is, one layer of film or sheet is made into the protection layer 500 by any of the following processes: extrusion, blown film, injection molding, and compression molding; Meanwhile, the protection layer 500 may also be a multi-layer composite structure, that is, multiple layers of films or sheets are made into the protection layer 500 by any of the following processes: extrusion, blown film, injection molding, and compression molding. It should be understood that the molding method of the protection layer 500 and a specific number of layers of the protection layer 500 shall be selected according to the needs of the application.

In an embodiment, printing the artwork 300 on the surface of the protection layer 500 comprises:

S210, manufacturing an artwork 300 fully or partially adapts to a shape and a size of the protection layer 500;

It can be understood that, the artwork 300 may adapt to the shape and the size of the protection layer 500. In the actual production, the artwork 300 may completely or partially cover the surface of the protection layer 500. In an embodiment, the protection layer 500 is in the shape of a rectangle, the artwork 300 may be in the shape of a rectangle and completely cover the surface of the protection layer 500; or the artwork 300 may be some other arbitrary polygon and cover the middle area of the surface of the protection layer 500. A specific direction or a position of the artwork 300 can be determined according to a final product related to the bottle. Further, the artwork 300 is made of ink or toner, and in actual production, there are two types of raw material used for printing, one is ink (liquid), the other is toner (solid particles).

S220, arranging a first adhesive layer 600 adapted to the artwork 300 on the surface of the protection layer 500;

In an embodiment of the present application, referencing to FIG. 2, a first adhesive layer 600 arranged on the surface of the protection layer 500 is adhered to the artwork 300 to ensure a good adhesion between the artwork 300 and the protection layer 500. The first adhesive layer 600 can be arranged on the outer side of the protection layer 500. Of course, a size and a shape of the first adhesive layer 600 may adapt to the size and the shape of the artwork 300 to form a better adhesion between the two layers, and to prevent the artwork 300 from peeling off from the protection layer 500. The size of the first adhesive layer 600 may be larger than that of the artwork 300 to provide a better adhesion between the artwork 300 and the protection layer 500 during production process.

S230, The printing of the artwork 300 on the surface of the protection layer 500 can be accomplished by adopting any of the following processes: offset printing, digital printing, and thermal transferring, to make the artwork 300 adhere to the first adhesive layer 600.

The artwork 300 may be printed on the surface of the protection layer 500 by any of the following processes: offset printing, digital printing, and thermal transferring. It should be stated that, offset printing, digital printing, and thermal transferring are all existing decoration technologies. Thus the printing process of the artwork 300 will not be repeated herein.

In an embodiment, the manufacturing the transparent layer 200 comprises:

S310, adopting a transparent or semitransparent elastomer material;

It can be understood that, since the transparent layer 200 is on the outmost layer, the transparent layer 200 must have a certain transparency to display the artwork 300, thus, a transparent or semitransparent elastomer material shall be selected to expose a certain amount of light, while the transparent layer 200 itself has a certain elasticity to resist an external pressure without being deformed. The transparent layer 200 may be in roll form to facilitate cutting during production. Further, the elastomer may be comprised of any one of thermoplastic elastomer, a thermoplastic polyurethanes, a silicon, and a rubber. The material of the transparent layer 200 may also be a chromatic material, a colored (single-color or mufti-color) material or a composite material containing particulates, such as metal chips or other particles or materials. On the other hand, the transparent layer 200 may be made wholly or partially of a recycled material or an environmental friendly material to reduce cost.

S320, manufacturing the transparent layer 200 using an elastomer material through adopting any of the following processes: injection molding, extrusion, compression molding, liquid injection molding, and calendering.

It can be understood that, the elastomer material may be manufactured into the transparent layer 200 by a plurality of molding methods. Therefore, a specific molding process of the transparent layer 200 will not be repeated here. The calendaring is a continuous process, in which a series of heated rollers are used, which are fed with a pre-mixed substance. When the substance passes through a continuous roll press region, such that a continuous sheet will be pressed to a preset thickness. Most calendered thermoplastics are composed of polyvinyl chloride, acrylonitrile-butadiene-styrene copolymer, and polystyrene, while others are using some grades of polyethylene and polypropylene. In a typical calendering process, a raw material is pumped into a carrier in the form of granules, powder or liquid. According to a blender recipe, a stabilizer, a plasticizer, and a pigment are added to the carrier, before mixing these ingredients in a blender and preparing a premix. During the mixing process, a powdered product with a uniform and stable color will be produced. After the mixing, a consuming rate of the material determines a temperature setting of the production process. A long residence time of such a paste-like substance at a high temperature must be limited, in order to prevent a material degradation. Calendering and compression molding are two distinct processes. Variations, from equipment using and processes point of view, could be easily found. For example, the compression molding utilizes high pressure on mold. It creates one product at a time, e.g. rubber shoes. Meanwhile, in calendering materials pass through multiple rollers, pressing the material thinner and thinner, producing a product in rolls of film eventually. One of the typical product is plastic film or a roll of aluminum. It is worth pointing out that, while the premix is passing through one or more of the rollers, one or a plurality of other additives, such as a pigment, a recycled material, and more, can be continuously added in.

It is worth mentioned that, after being formed, the transparent layer 200 may be cut or die-cut to obtain an ideal shape. In an embodiment, the shape of the transparent layer 200 is consistent to that of the protection layer 500 and the fitting area 110 for a better fit. Of course, the transparent layer 200 may have further texture arranged on the outer side of the transparent layer 200. After the transparent layer 200 is arranged on the bottle body 100, the texture can play a role of non-slip, facilitating to grasp the bottle body 100. The texture may be produced during an injection molding process of the transparent layer 200, or during a secondary processing using heat and pressure from a special equipment after the transparent layer 200 is formed.

In an embodiment, laminating the protection layer 500 with the printed artwork 300 and the transparent layer 200 is comprised of:

S410, arranging a second adhesive layer 700 on the surface of the transparent layer 200;

It can be understood that, the second adhesive layer 700 arranged on the surface of the transparent layer 200 is applied to adhering the protection layer 500 to the artwork 300. The second adhesive layer 700 is arranged on the inner side of the transparent layer 200 to adhere to the outer side of the protection layer 500 and laminate the outer side of the artwork 300, to ensure forming a good adhesion between the transparent layer 200 and the protection layer 500, and protecting the artwork 300. The size and a shape of the second adhesive layer 700 adapts to the size and the shape of the transparent layer 200 to form a good adhesion in between, and provide a tighter adhesion between the transparent layer 200 and the protection layer 500.

S420, adhering the transparent layer 200 to the surface of the protection layer 500 having the artwork 300 arranged through the second adhesive layer 700.

The transparent layer 200 can be laminated with the protection layer 500 through a special equipment (a customized equipment). After the lamination, the transparent layer 200, the artwork 300, and the protection layer 500 are combined together, the whole structure after the lamination can be in rolls for a subsequent overall cutting or die cutting.

Further, the material of the first adhesive layer 600 and the second adhesive layer 700 may be a plastic resin film, or other plastics including a polypropylene or a thermoplastic elastomer.

It is worth mentioned that, in the bottle manufacturing method provided by the present application may further print the artwork 300 or ink on the outer surface of the transparent layer 200 or the protection layer 500 by a thermal transferring, a digital printing or a pad printing, to make the bottle body 100 more attractive.

Further, after laminating the protection layer 500 and the transparent layer 200, the protection layer 500 and the transparent layer 200 can be adhered to the bottle body 100 to make the artwork 300 locate between the protection layer 500 and the transparent layer 200.

The manufacturing method of the bottle provided by the present application is described in details below, in conjunction with a usage scenario:

A protection layer 500 is prepared, and a first adhesive layer 600 is arranged on the outer side of the protection layer 500. Then an artwork 300 is printed on the outer side of the protection layer 500 to make the artwork 300 adhere to the first adhesive layer 600. A transparent layer 200 is prepared, and a second adhesive layer 700 is arranged on the inner side of the transparent layer 200. The transparent layer 200 is adhered to the outer side of the protection layer 500 through the second adhesive layer 700. The protection layer 500 and the transparent layer 200 are arranged into a fitting area 110 on the bottle body 100, to make the artwork 300 locate between the protection layer 500 and the transparent layer 200.

The present application further discloses a bottle, which is manufactured by the manufacturing method mentioned above. It should be understood that, since the bottle manufacturing method has been described in details above, it will not be repeated here.

All above, the present application provides a bottle manufacturing method and a bottle, which comprises steps of manufacturing a protection layer; printing an artwork on a surface of the protection layer; manufacturing a transparent layer; laminating the protection layer with printed artwork and the transparent layer; arranging the protection layer and the transparent layer on a bottle body to make the artwork locate between the protection layer and the transparent layer. By printing the artwork between the protection layer and the transparent layer, the present application provides the artwork a good protection to prevent the artwork from worn, and achieve a relatively high decoration quality.

It should be understood that, the present application is not limited to the above embodiments listed. Those skilled in this field can improve or modify the application according to the above descriptions, all of these improvements and transforms should belong to the scope of protection in the appended claims of the present application.

What is claimed is:

1. A bottle manufacturing method, comprising:
   manufacturing a protection layer, wherein the protection layer is transparent;
   printing an artwork on a first surface of the protection layer, wherein the protection layer has a second surface facing opposite of the first surface;
   manufacturing a transparent layer;
   laminating the first surface of the protection layer having the printed artwork with the transparent layer, thereby irremovably covering an entirety of the printed artwork with the transparent layer to form a single layer structure; and
   arranging the single layer structure of the protection layer and the transparent layer on a bottle body with the printed artwork located between the protection layer and the transparent layer, the printed artwork facing away from the bottle body, and the second surface of the protection layer directly abutting the bottle body.

2. The bottle manufacturing method according to claim 1, further comprising:
   manufacturing the bottle body by a blow molding or an injection molding;
   arranging a fitting area on the bottle body, wherein a size of the fitting area adapts to a size of the protection layer and the transparent layer.

3. The bottle manufacturing method according to claim 1, wherein manufacturing a protection layer comprises:
   adopting a plastic film or a plastic sheet;
   manufacturing the protection layer by at least one layer of the film or the sheet through a method selected from the group consisting of extrusion molding, blown film, injection molding, and compression molding.

4. The bottle manufacturing method according to claim 3, wherein the plastic is selected from the group consisting of thermoplastic elastomer, polyethylene terephthalate, polyethylene, and polypropylene.

5. The bottle manufacturing method according to claim 1, wherein the printing an artwork on the first surface of the protection layer comprising:
   manufacturing an artwork fully or partially adapted to a shape and a size of the protection layer;
   arranging a first adhesive layer adapted to the artwork on the first surface of the protection layer;
   printing the artwork on the first surface of the protection layer by adopting a method selected from the group consisting of offset printing, digital printing, and thermal transferring, to make the artwork adhere to the first adhesive layer.

6. The bottle manufacturing method according to claim 1, wherein the artwork is made of ink or toner.

7. The bottle manufacturing method according to claim 1, wherein manufacturing a transparent layer comprises:
  adopting a transparent or semitransparent elastomer material;
  manufacturing the transparent layer by the elastomer material through a method selected from the group consisting of injection molding, extrusion, compression molding, liquid injection molding, and calendaring.

8. The bottle manufacturing method according to claim 7, wherein the elastomer is selected from the group consisting of thermoplastic elastomer, thermoplastic polyurethanes, silicon, and rubber.

9. The bottle manufacturing method according to claim 1, wherein the laminating the protection layer with printed artwork and the transparent layer comprises:
  arranging a second adhesive layer on a surface of the transparent layer;
  adhering the transparent layer to the first surface of the protection layer having the artwork arranged through the second adhesive layer.

10. A bottle comprising:
a protection layer with a first surface and a second surface facing opposite of the first surface, wherein the protection layer is transparent;
an artwork printed on the first surface of the protection layer;
a transparent layer laminated to the first surface of the protection layer, wherein an entirety of the printed artwork is irremovably covered with the transparent layer to form a single layer structure; and
a bottle body, wherein the single layer structure of the protection layer and the transparent layer are arranged on the bottle body with the printed artwork located between the protection layer and the transparent layer, and wherein the printed artwork is facing away from the bottle body, and wherein the second surface of the protection layer directly abuts the bottle body.

11. A bottle comprising:
a protection layer with a first surface and a second surface facing opposite of the first surface, wherein the protection layer is transparent;
an artwork printed on the first surface of the protection layer;
a transparent layer laminated to the first surface of the protection layer, wherein an entirety of the printed artwork is irremovably covered with the transparent layer to form a single layer structure; and
a bottle body having at least one fitting area, wherein the single layer structure of the protection layer and the transparent layer are arranged in the at least one fitting area with the printed artwork located between the protection layer and the transparent layer, wherein the printed artwork is facing away from the bottle body, wherein the second surface of the protection layer directly abuts the bottle body, and wherein the at least one fitting area is recessed relative to an outer surface of the bottle body and has a depth consistent with a thickness of the single layer structure such that the outer surface of the bottle body is smooth with the single structure.

* * * * *